United States Patent
Mager et al.

(10) Patent No.: US 9,261,213 B2
(45) Date of Patent: Feb. 16, 2016

(54) HOSE COUPLING

(71) Applicant: NEOPERL GMBH, Mullheim (DE)

(72) Inventors: Kevin Mager, Mullheim (DE); Werner Kury, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 14/274,207

(22) Filed: May 9, 2014

(65) Prior Publication Data

US 2014/0246851 A1 Sep. 4, 2014

Related U.S. Application Data

(63) Continuation-in-part of application No. 13/203,924, filed as application No. PCT/EP2010/001057 on Feb. 19, 2010, now Pat. No. 8,752,867.

(30) Foreign Application Priority Data

Mar. 3, 2009 (DE) .......................... 10 2009 011 411
Apr. 19, 2014 (DE) .......................... 10 2014 005 837

(51) Int. Cl.
  *F16L 33/00* (2006.01)
  *F16L 33/207* (2006.01)
  *E03C 1/02* (2006.01)

(52) U.S. Cl.
  CPC ............. *F16L 33/2076* (2013.01); *E03C 1/025* (2013.01)

(58) Field of Classification Search
  USPC .......................................................... 285/256
  See application file for complete search history.

(56) References Cited

U.S. PATENT DOCUMENTS

| | | | |
|---|---|---|---|
| 1,678,640 A | 7/1928 | Hall | |
| 2,139,745 A | 12/1938 | Goodall | |
| 2,230,115 A * | 1/1941 | Kreidel | 285/259 |
| 2,371,971 A * | 3/1945 | Main et al. | 285/259 |
| 3,237,974 A | 3/1966 | Press | |
| 3,530,900 A * | 9/1970 | Kish | 285/256 |
| 4,330,142 A | 5/1982 | Paini | |
| 4,603,888 A | 8/1986 | Goodall et al. | |
| 4,817,997 A | 4/1989 | Ingram | |
| 5,165,733 A | 11/1992 | Sampson | |
| 5,487,571 A | 1/1996 | Robertson | |
| 5,853,202 A | 12/1998 | Li et al. | |
| 6,318,763 B1 | 11/2001 | Huang | |
| 6,394,506 B1 | 5/2002 | Street | |
| 6,715,800 B1 | 4/2004 | Hennig | |

(Continued)

FOREIGN PATENT DOCUMENTS

| | | |
|---|---|---|
| DE | 19936413 C1 | 3/2001 |
| FR | 2894011 A1 | 6/2007 |

(Continued)

*Primary Examiner* — David E Bochna
(74) *Attorney, Agent, or Firm* — Volpe and Koenig, P.C.

(57) ABSTRACT

A hose coupling (1) is provided, having a sleeve-like configuration and at least one coupling end with a connector (3), at the at least one coupling end, with a retaining profile provided on the outer circumference of at least one connector sub-region, it being possible for a hose end (4) of a flexible hose (2) to be pushed onto said at least one profiled coupling end. The retaining profile is formed by at least one retaining groove (5) which is provided on the outer circumference of the connector (3) and has longitudinal groove sides (8, 9) oriented in the circumferential direction of the connector and narrow groove sides (6, 7) oriented in the longitudinal direction of the connector.

12 Claims, 3 Drawing Sheets

(56) References Cited

U.S. PATENT DOCUMENTS

| | | |
|---|---|---|
| 6,874,823 B2 | 4/2005 | Viegener |
| 7,364,206 B2 | 4/2008 | Romanelli et al. |
| 7,849,884 B2 | 12/2010 | Dickel |
| 8,752,867 B2 * | 6/2014 | Mager et al. .................. 285/256 |
| 2010/0194100 A1 | 8/2010 | Koch |

FOREIGN PATENT DOCUMENTS

| | | |
|---|---|---|
| JP | 8226589 A | 9/1996 |
| WO | 2014013984 A1 | 9/2014 |

* cited by examiner

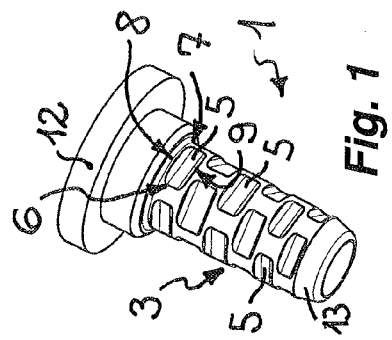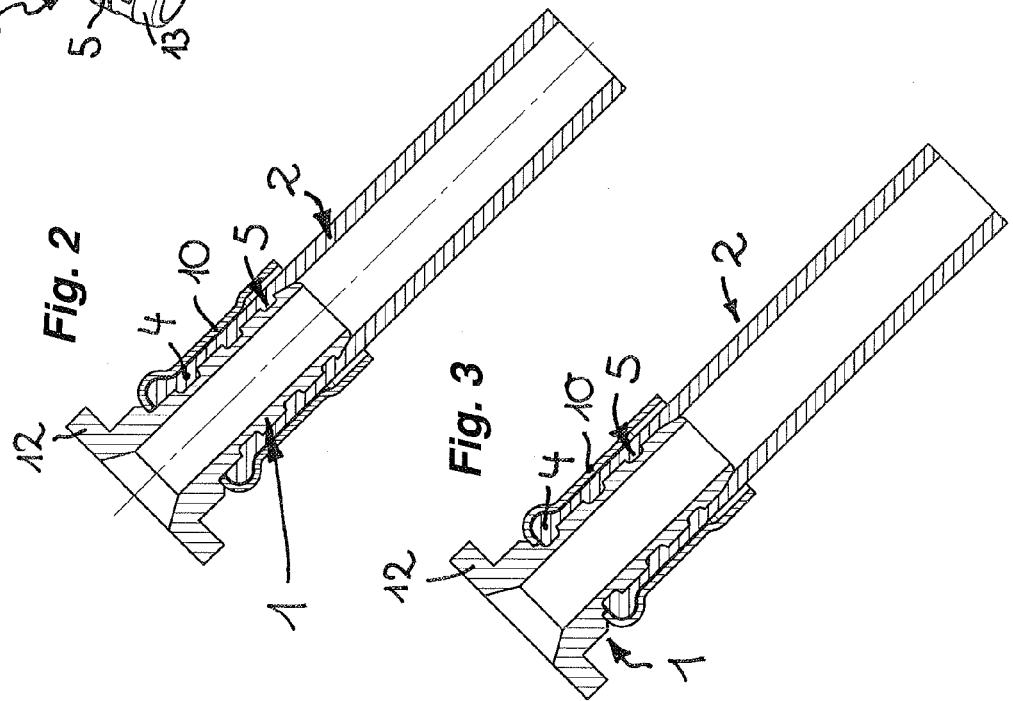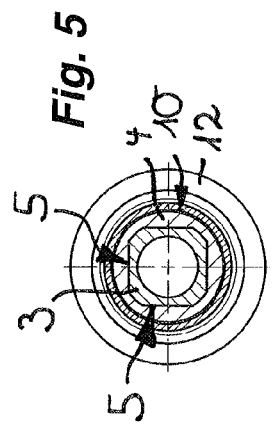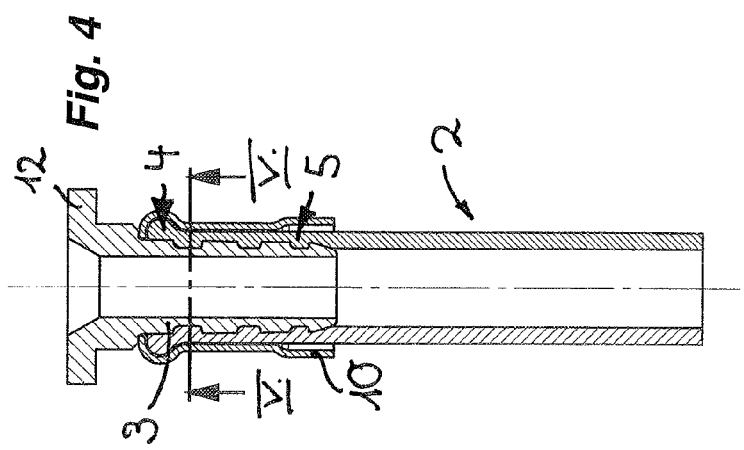

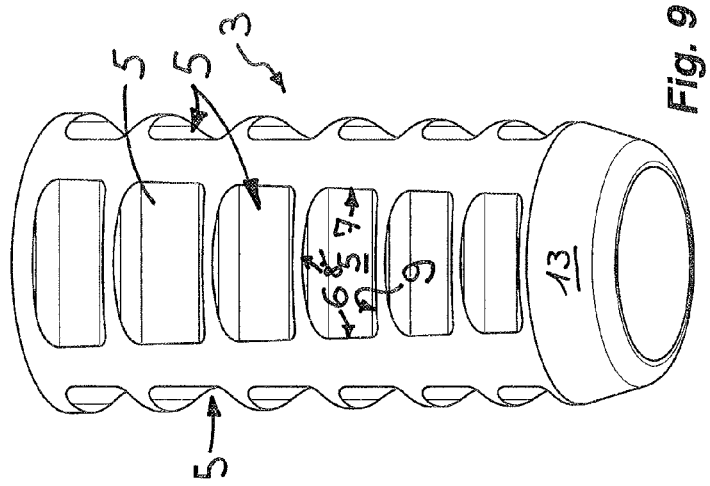
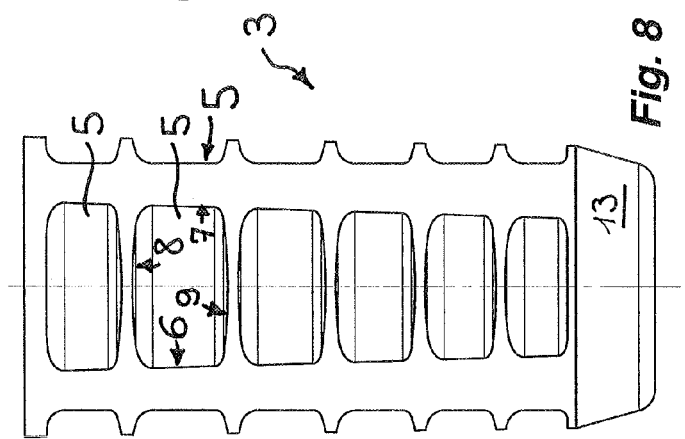
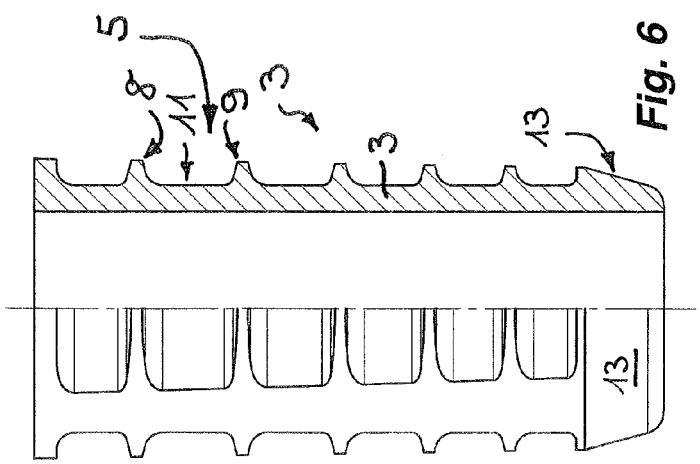
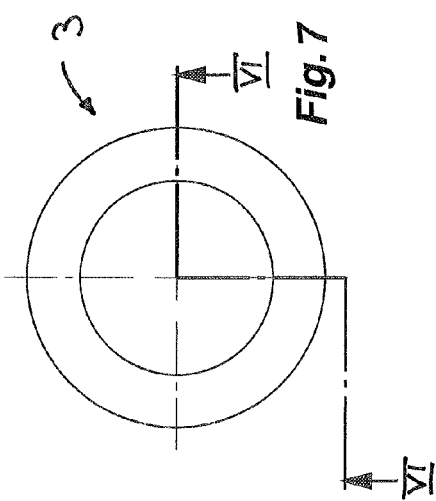

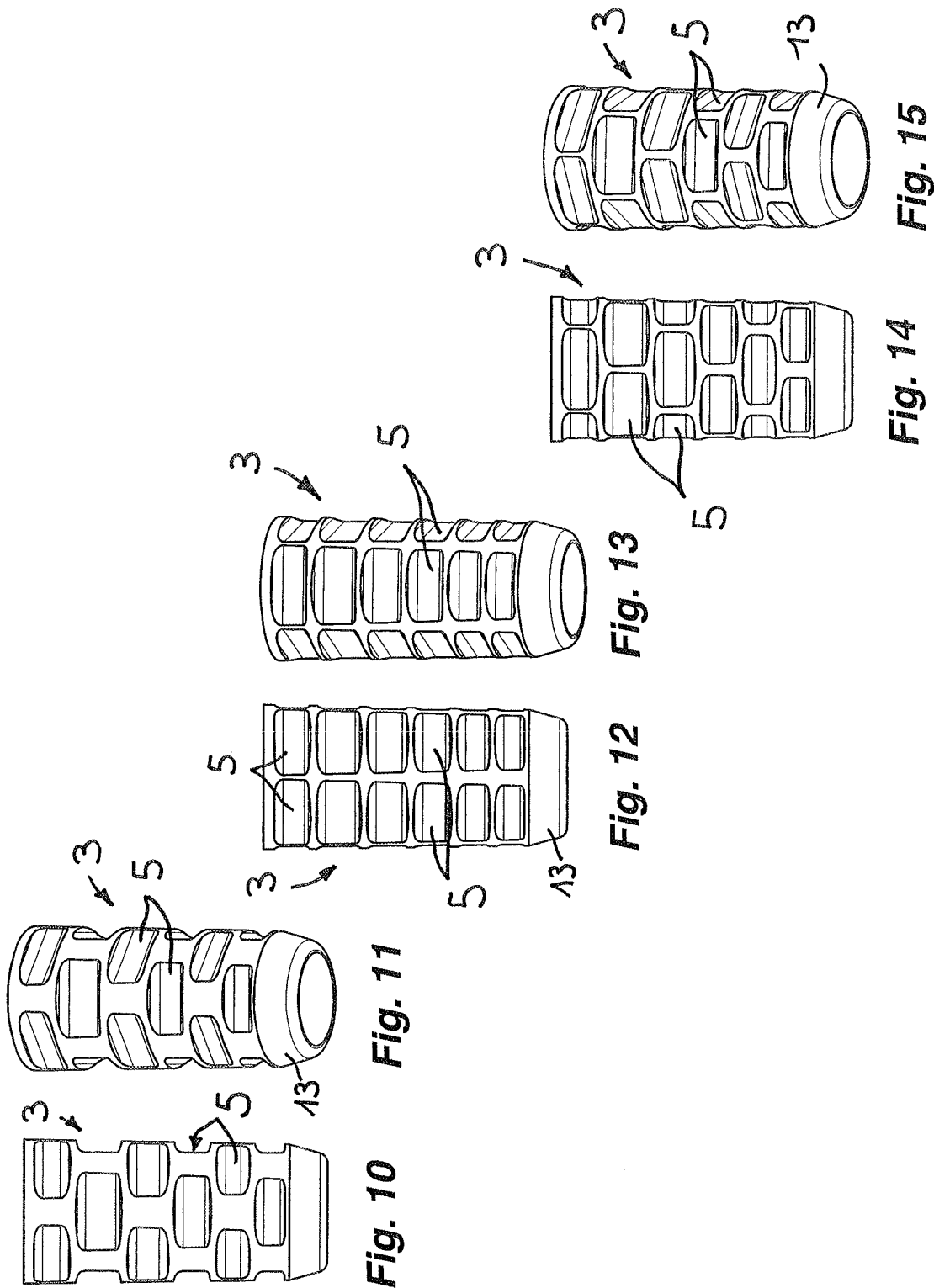

HOSE COUPLING

RELATED APPLICATIONS

The present application is a continuation-in-part of U.S. Pat. No. 8,752,867 issued Jun. 17, 2014. The present application also claims benefit of German Patent Application No. 10 2014 005 837.9, filed Apr. 19, 2014. The entire contents of all of which are incorporated by reference herein as if fully set forth.

FIELD OF THE INVENTION

The invention relates to a hose coupling with a sleeve-like configuration and, at at least one coupling end, has a connector with a retaining profiling provided on the outer circumference of at least one connector sub-region. A hose end of a flexible hose is able to be pushed onto said profiled coupling end.

BACKGROUND

In the sanitary sector, the use of thin copper pipes is increasingly being replaced by the use of flexible hose lines in order to supply water, for example, from a corner valve to a washbasin or similar point of water consumption. A hose coupling of the type mentioned in the introduction is necessary in order to connect the flexible hose to the corner valve or similar water-supply line and/or to the point of water consumption.

The hose couplings which are already known are usually of a sleeve-like design and, at their one end, have a connection thread or a union nut, while a connector is provided at the other coupling end. This connector has a retaining profiling on the outer circumference of at least one connector sub-region, and therefore one of the two hose ends of a flexible hose can be pushed onto said profiled coupling end. This retaining profiling is often formed from at least one annular flange which tapers, towards its outer circumference, in the direction of the free connector end, such that the hose end can be easily pushed on. The disadvantage, however, is that such an annular flange which tapers to a sharp point on the outer circumference acts like an encircling cutting edge. If the hose line is subjected to a torque, and if the connector is rotated relative to the hose line, there is a risk of the at least one annular flange digging into the inner circumference of the hose line, which may be associated with poor sealing or with reduced bursting resistance of the hose line.

It is therefore an object to provide a hose coupling of the type mentioned in the introduction which, even in the event of the hose line being rotated in relation to the connector, still ensures a high level of sealing and loading capability.

SUMMARY

This object is achieved according to the invention, in the case of the hose coupling of the type mentioned in the introduction, in particular in that the retaining profiling is formed by at least one retaining groove which is provided on the outer circumference of the connector and has longitudinal groove sides oriented in the circumferential direction of the connector and narrow groove sides oriented in the longitudinal direction of the connector.

In the case of the hose coupling according to the invention, the retaining profiling is formed by at least one retaining groove which is provided on the outer circumference of the connector. The retaining groove, which is provided in the form of a hollow on the outer circumference of the connector has longitudinal groove sides oriented in the circumferential direction of the connector and narrow groove sides oriented in the longitudinal direction of the connector. The elastic material on the inner circumference of the flexible hose is displaced into said at least one retaining groove so as to ensure that the connection between the connector and the hose end of the flexible hose line is a form-fitting one which can be subjected to loading. The inner circumference of the hose end here butts against the retaining-groove-bearing outer circumference of the connector. Since it is possible to dispense with the above annular flanges which taper on the outer circumference, there is no need for the inner circumference of the hose to be subjected to stability-reducing cutting action. The hose coupling according to the invention is distinguished by a high level of sealing, loading capability and bursting resistance even when the hose line is rotated in relation to the hose coupling.

In order to ensure that the connection between the connector and the hose end pushed onto the connector can be subjected even to a relatively high torque, it is advantageous if the at least one retaining groove has a groove base which is of planar design or concave configuration. Even relatively high torques can be transmitted, and discharged, to such a non-round connecting region between the connector, on the one hand, and the hose line pushed onto the same, on the other hand.

So that the retaining grooves do not merge into one another, it is advantageous if the retaining profiling has at least two retaining grooves of which the adjacent narrow groove sides are spaced apart from one another. If the narrow groove sides of the adjacent retaining grooves are spaced apart from one another, this reliably avoids rotary movement between the connector, on the one hand, and the hose end pushed onto the same, on the other hand.

The capability to transmit even high torques to the connection provided between the connector and hose line is further promoted if the retaining profiling has at least two retaining grooves arranged approximately on a common circumferential line.

A particularly straightforward embodiment according to the invention here, which can be produced with comparatively low outlay, provides for the retaining grooves arranged on a common circumferential line to be distributed at regular intervals over the circumference of the connector.

The connection which is provided between the connector and hose end by the hose coupling according to the invention, and is capable of being produced straightforwardly and subjected to a high level of loading, is particularly firm and capable of withstanding loading in particular when the retaining grooves, arranged on a common circumferential line, define a triangular, quadrilateral, hexagonal or polygonal connector cross section.

In order to provide the retaining profiling according to the invention on a connector sub-region as long as possible, it may be expedient if retaining grooves arranged on at least two circumferential lines are provided at least in a sub-region of the connector, and if the facing longitudinal groove sides of the retaining grooves arranged on adjacent circumferential lines are spaced apart from one another.

One embodiment according to the invention here provides for the retaining grooves arranged on adjacent circumferential lines to be provided in lines arranged in axis-parallel fashion in relation to the longitudinal axis of the connector.

Another embodiment according to the invention, which differs from the above, provides for the retaining grooves arranged on adjacent circumferential lines to be offset in relation to one another. It is particularly advantageous here if the retaining grooves arranged on adjacent circumferential lines are offset in relation to one another such that adjacent narrow groove sides of retaining grooves arranged on a common circumferential line are arranged approximately centrally in relation to a retaining groove provided on an adjacent circumferential line.

In order for it to be possible for the free hose end to be easily pushed onto the hose-coupling connector designed according to the invention, it is expedient if the connector has an end region which is free of grooves on the outer circumference.

The operation of pushing the free hose end easily onto the connector of the hose coupling according to the invention is assisted if the groove-free end region tapers preferably conically in the direction of the end of the connector.

In order for the inner circumference of the hose to be pushed to particularly good effect into the retaining grooves provided on the connector, and serving as retaining profiling, it is advantageous if the hose end pushed onto the profiled coupling end is retained there by means of a ferrule engaging around the hose end.

BRIEF DESCRIPTION OF THE DRAWINGS

Developments according to the invention can be gathered from the claims in conjunction with the figures and also from the description. The invention will be described in yet more detail hereafter with reference to preferred exemplary embodiments.

In the figures:

FIG. 1 shows a perspective illustration of a hose coupling which has a connector which, on the outer circumference of at least one connector sub-region, has a retaining profiling, which is formed by a multiplicity of retaining grooves, FIG. 2 shows a longitudinal section of a hose coupling which is designed according to FIG. 1 and has a hose end of a flexible hose line pushed onto its connector, wherein the hose end is retained on the connector by means of ferrule which engages around the hose end in the region of the profiled coupling end, FIG. 3 shows the hose coupling from FIG. 2 in a longitudinal section which has been rotated slightly in the circumferential direction, FIG. 4 shows a longitudinal section of the hose coupling which has already been shown in FIGS. 2 and 3, the hose end having the ferrule engaging around it, FIG. 5 shows the hose coupling from FIGS. 2 to 4 in a cross section taken through section plane V-V, FIG. 6 shows a partial longitudinal section of the connector of a hose coupling, wherein the connector bears a multiplicity of retaining grooves which are provided, on adjacent circumferential lines, in lines arranged in axis-parallel fashion in relation to the longitudinal axis of the connector, FIG. 7 shows a schematically illustrated cross section through the connector according to FIG. 6, with an indication of the section line of the partial longitudinal section shown in FIG. 6, FIG. 8 shows a side view of the connector from FIGS. 6 and 7, FIG. 9 shows a perspective view from the side of the connector from FIGS. 6 to 8, it being possible to see the free end of said connector, FIG. 10 shows a connector with a retaining profiling formed by a multiplicity of retaining grooves, wherein said retaining grooves arranged on adjacent circumferential lines are offset in relation to one another, FIG. 11 shows a perspective view from beneath of the free end of the connector from FIG. 10, FIG. 12 shows a side view of a connector configured in a manner comparable to FIGS. 6 to 9, FIG. 13 shows a perspective view from beneath of the free end of the connector from FIG. 12, FIG. 14 shows a side view of a connector configured in a manner comparable to FIG. 10, and FIG. 15 shows a bottom perspective view of the free end of the connector from FIG. 14.

DETAILED DESCRIPTION OF THE PREFERRED EMBODIMENTS

FIGS. 1 to 5 illustrate a hose coupling 1 which serves for connecting a flexible hose 2, for example, on a corner valve or on a sanitary outflow fitting or similar point of water consumption. At at least one coupling end, the hose coupling 1, which is of sleeve-like configuration, has a connector 3, which bears a retaining profiling on the outer circumference of at least one connector sub-region.

As can be seen in FIGS. 2 to 5, a hose end 4 of the flexible hose 2 can be pushed onto the at least one profiled coupling end. The retaining profiling, which is provided on the connector 3 of the hose coupling 1, is formed by at least one and preferably—as is the case here—by a plurality of retaining grooves 5, provided on the outer circumference of the connector 3. Each of these retaining grooves 5, which are configured in the form of a hollow in the outer circumference of the connector, has narrow groove sides 6, 7 oriented in the longitudinal direction of the connector and longitudinal groove sides 8, 9 oriented in the circumferential direction of the connector.

Some of the retaining grooves 5 in each case are arranged on a common circumferential line of the connector. The adjacent narrow groove sides 6, 7 of adjacent retaining grooves 5 here are spaced apart from one another. Whereas the retaining grooves 5 arranged on one of the circumferential lines in the connector shown in FIGS. 6 to 9 define a quadrilateral connector cross section, the corresponding retaining grooves 5 arranged on one of the circumferential lines in the embodiments shown in FIGS. 12 to 15 form a hexagonal connector cross section. It can be seen in FIGS. 6 to 9 and 12 to 13 that the retaining grooves 5 arranged on adjacent circumferential lines may be provided in lines arranged in axis-parallel fashion in relation to the longitudinal axis of the connector. In contrast, it can be seen from FIGS. 1, 10 to 11 and 14 to 15 that the retaining grooves 5 arranged on adjacent circumferential lines may also be offset in relation to one another such that adjacent narrow groove sides 6, 7 of retaining grooves 5 arranged on a common circumferential line are arranged approximately centrally in relation to a retaining groove 5 provided on an adjacent circumferential line.

It can be seen in FIGS. 1, 6 and 8 to 15 that the connector may have an end region 13 which is free of grooves on the outer circumference. In order for it to be possible for the hose end 4 of the flexible hose 2 to be easily pushed onto the connector 3 without much outlay being required, it is advantageous if the groove-free end region 13 tapers preferably conically in the direction of the end. So that the elastic material of the flexible hose 2 can dig well into the retaining grooves 5 serving as the retaining profiling, a ferrule 10 is provided, and this engages around the hose end 4 of the hose 2 pushed onto the profiled coupling end. This ferrule 10 can be changed or deformed from a widened starting position (not shown specifically here) into the retaining position of reduced cross section, which is shown in FIGS. 2 to 4. The hose coupling 1 may bear a connection thread at its coupling end directed away from the connector 3. In contrast, the hose couplings 1 illustrated here, at their coupling end directed away from the connector 3, have an annular flange 12, which has a union nut (not shown specifically here) engaging behind it and has the connector 3 passing through its through-passage opening. In order for it to be possible for the free hose ends of two adjacent flexible hose lines to be connected to one another, the hose coupling may also have a connector at each of its two coupling ends.

It is understood, therefore, that this invention is not limited to the particular embodiments disclosed, but is intended to cover all modifications which are within the spirit and scope of the invention as defined by the appended claims; the above description; and/or shown in the attached drawings.

LIST OF REFERENCE NUMERALS

1 Hose coupling
2 Hose
3 Connector
4 Hose end
5 Retaining groove
6 Narrow groove side
7 Narrow groove side
8 Longitudinal groove side
9 Longitudinal groove side
10 Ferrule
11 Groove base
12 Annular flange
13 Groove-free end region

What is claimed is:

1. A hose coupling (1) having a sleeve-like configuration and at least one coupling end, the hose coupling comprising a connector (3), at the at least one coupling end, with a retaining profile provided on an outer circumference of at least one connector sub-region, configured to have a hose end (4) of a flexible hose (2) pushed onto said at least one profiled coupling end, wherein the retaining profile is formed by a plurality of longitudinally and circumferentially spaced retaining grooves (5) which are provided on the outer circumference of the connector (3) each of the retaining grooves having longitudinal groove sides (8, 9) oriented in the circumferential direction of the connector and narrow groove sides (6, 7) oriented in the longitudinal direction of the connector, and wherein an axial width of the longitudinally spaced retaining grooves decreases towards the coupling end.

2. The hose coupling as claimed in claim 1, wherein the at least one retaining groove (5) has a groove base (11) which is of planar design or concave configuration.

3. The hose coupling as claimed in claim 1, wherein the retaining profiling has at least two retaining grooves (5) and wherein adjacent narrow groove sides (6, 7) are spaced apart from one another.

4. The hose coupling as claimed in claim 1, wherein the retaining profiling has at least two retaining grooves (5) arranged approximately on a common circumferential line.

5. The hose coupling as claimed in claim 4, wherein the retaining grooves (5) arranged on a common circumferential line are distributed at regular intervals over the circumference of the connector.

6. The hose coupling as claimed in claim 4, wherein the retaining grooves (5) arranged on a common circumferential line define a triangular, quadrilateral, hexagonal or polygonal connector cross section.

7. The hose coupling as claimed in claim 4, wherein the retaining grooves (5) arranged on adjacent circumferential lines are provided in lines arranged in axis-parallel fashion in relation to the longitudinal axis of the connector.

8. The hose coupling as claimed in claim 4, wherein the retaining grooves (5) arranged on adjacent circumferential lines are offset in relation to one another.

9. The hose coupling as claimed in claim 8, wherein the retaining grooves (5) arranged on adjacent circumferential lines are offset in relation to one another such that adjacent narrow groove sides (6, 7) of retaining grooves (5) arranged on a common circumferential line are arranged approximately centrally in relation to a retaining groove (5) provided on an adjacent circumferential line.

10. The hose coupling as claimed in claim 1, wherein the connector has an end region (13) which is free of grooves on the outer circumference.

11. The hose coupling as claimed in claim 10, wherein the connector (3) comprises a groove-free end region (13) that tapers conically in the direction of the end.

12. The hose coupling as claimed in claim 1, wherein the hose end (4) pushed onto the profiled coupling end is retained thereon by a ferrule (10) engaging around the hose end (4).

* * * * *